United States Patent [19]

Bruckert

[11] Patent Number: 5,224,122
[45] Date of Patent: Jun. 29, 1993

[54] METHOD AND APPARATUS FOR CANCELING SPREAD-SPECTRUM NOISE

[75] Inventor: Eugene Bruckert, Arlington Heights, Ill.

[73] Assignee: Motorola, Inc., Schaumburg, Ill.

[21] Appl. No.: 906,109

[22] Filed: Jun. 29, 1992

[51] Int. Cl.⁵ .................. H04B 1/10; H04L 27/32; H03D 13/00

[52] U.S. Cl. ........................... 375/1; 375/96; 375/102; 370/18

[58] Field of Search .............. 375/1, 96, 102; 342/378, 383, 384; 370/18

[56] References Cited

U.S. PATENT DOCUMENTS

| | | |
|---|---|---|
| 3,374,435 | 3/1968 | Engel . |
| 3,617,900 | 11/1971 | Fink et al. . |
| 3,667,050 | 5/1972 | Gibson . |
| 3,699,463 | 10/1972 | Stone . |
| 4,470,138 | 9/1984 | Gutleber .................. 370/18 |
| 4,472,814 | 9/1984 | Gutleber . |
| 4,472,815 | 9/1984 | Gutleber . |
| 4,475,214 | 10/1984 | Gutleber . |
| 4,475,215 | 10/1984 | Gutleber . |
| 4,901,307 | 2/1990 | Gilhousen et al. . |
| 4,914,675 | 4/1990 | Iwamatsu et al. . |
| 5,056,109 | 10/1991 | Gilhousen et al. . |
| 5,099,493 | 3/1992 | Zeger et al. ............ 375/1 |
| 5,101,501 | 3/1992 | Gilhousen et al. . |
| 5,103,459 | 4/1992 | Gilhousen et al. . |
| 5,105,435 | 4/1992 | Stilwell . |

FOREIGN PATENT DOCUMENTS 55-147847 11/1980 Japan .

OTHER PUBLICATIONS

"A Communication Technique for Multipath Channels" Proceeding of the IRE R. Price.

The Transactions of the Institute of Electronics, Information and Communications Engineers vol. E71, No. 3 (Mar. 1988) "Spread Spectrum Multiple Access System with Intrasystem Interference Cancellation" Tatsuro Masamura.

*Primary Examiner*—Gilberto Barron, Jr.
*Attorney, Agent, or Firm*—Shawn B. Dempster

[57] ABSTRACT

A spread-spectrum noise canceller (182) is provided. A received phase and a received amplitude for a first (216) and a second (236) component of a received spread-spectrum signal (200) is determined. The second component (236) is a replica of the first component (216) which was received at a different time. In addition, the spread-spectrum signal (200) includes a known signal. A portion of a spread-spectrum noise signal in the received signal (200) is canceled by generating an estimated signal (270) by spreading (260) the known signal at the second component received phase (204) with the known signal at the first component received phase (224) and adjusting a gain (268) of an integrated form of the spread known signal as a function of the received amplitudes of the first (216) and the second (236) components. Subsequently, the known signal is processed out of the received spread-spectrum signal (200) by subtracting (166) the estimated signal (270) from a demodulated form (216, 236) of the received spread-spectrum signal (200).

20 Claims, 3 Drawing Sheets

FIG. 1 —PRIOR ART—

METHOD AND APPARATUS FOR CANCELING SPREAD-SPECTRUM NOISE

FIELD OF THE INVENTION

The present invention relates to communication systems which employ spread-spectrum signals and, more particularly, to a method and apparatus for canceling spread-spectrum noise in a communication channel.

BACKGROUND OF THE INVENTION

In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Two types of channels exist, namely, point-to point channels and broadcast channels. Examples of point-to-point channels includes wirelines (e.g., local telephone transmission), microwave links, and optical fibers. In contrast, broadcast channels provide a capability where many receiving stations may be reached simultaneously from a single transmitter (e.g., local television and radio stations).

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, and improved security of communication through the use of encryption.

These advantages are attained at the cost of increased transmission (channel) bandwidth and increased system complexity. Through the use of very large-scale integration (VLSI) technology a cost-effective way of building the hardware has been developed.

One digital transmission method that may be used for the transmission of message signals over a communication channel is pulse-code modulation (PCM). In PCM, the message signal is sampled, quantized, and then encoded. The sampling operation permits representation of the message signal by a sequence of samples taken at uniformly spaced instants of time. Quantization trims the amplitude of each sample to the nearest value selected from a finite set of representation levels. The combination of sampling and quantization permits the use of a code (e.g., binary code) for the transmission of a message signal. Other forms of digital transmission use similar methods to transmit message signals over a communication channel.

When message signals are digitally transmitted over a band-limited channel, a form of interference known as intersymbol interference may result. The effect of intersymbol interference, if left uncontrolled, is to severely limit the rate at which digital data may be transmitted without error over the channel. The cure for controlling the effects of intersymbol interference may be controlled by carefully shaping the transmitted pulse representing a binary symbol 1 or 0.

Further, to transmit a message signal (either analog or digital) over a bandpass communication channel, the message signal must be manipulated into a form suitable for efficient transmission over the channel. Modification of the message signal is achieved by means of a process termed modulation. This process involves varying some parameter of a carrier wave in accordance with the message signal in such a way that the message information is preserved and that the spectrum of the modulated wave contained in the assigned channel bandwidth. Correspondingly, the receiver is required to re-create the original message signal from a degraded version of the transmitted signal after propagation through the channel. The re-creation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several message sources over a common channel. Also, modulation may be used to convert the message signal into a form less susceptible to noise and interference.

Typically, in propagating through a channel, the transmitted signal is distorted because of nonlinearities and imperfections in the frequency response of the channel. Other sources of degradation are noise and interference added to the received signal during the course of transmission through the channel. Noise and distortion constitute two basic limitations in the design of communication systems.

There are various sources of noise, internal as well as external to the system. Although noise is random in nature, it may be described in terms of its statistical properties such as the average power or the spectral distribution of the average power.

In any communication system, there are two primary communication resources to be employed, namely, average transmitted power and channel bandwidth. The average transmitted power is the average power of the transmitted signal. The channel bandwidth defines the range of frequencies that the channel uses for the transmission of signals with satisfactory fidelity. A general system design objective is to use these two resources as efficiently as possible. In most channels, one resource may be considered more important than the other. Hence, we may also classify communication channels as power-limited or band-limited. For example, the telephone circuit is a typical band-limited channel, whereas a deep-space communication link or a satellite channel is typically power-limited.

The transmitted power is important because, for a receiver of prescribed noise figure, it determines the allowable separation between the transmitter and receiver. In other words, for a receiver of prescribed noise figure and a prescribed distance between it and the transmitter, the available transmitter power determines the signal-to-noise ratio at the receiver input. This, subsequently, determines the noise performance of the receiver. Unless this performance exceeds a certain design level, the transmission of message signals over the channel is not considered to be satisfactory.

Additionally, channel bandwidth is important; because, for a prescribed band of frequencies characterizing a message signal, the channel bandwidth determines the number of such message signals that can be multiplexed over the channel. In other words, for a prescribed number of independent message signals that have to share a common channel, the channel bandwidth determines the band of frequencies that may be allotted to the transmission of each message signal without discernible distortion.

For spread-spectrum communication systems, these areas of concern have been optimized in one particular manner. In spread-spectrum systems, a modulation technique is utilized in which a transmitted signal is spread over a wide frequency band. The frequency band is wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself. A spread-spectrum system, on the other hand, often takes a baseband signal (e.g., a voice channel) with a bandwidth of only a few kilohertz, and distributes it over a band that may be many megahertz wide. This is accomplished by modulating with the information to be sent and with a wideband encoding signal. Through the use of spread-spectrum modulation, a message signal may be transmitted in a channel in which the noise power is higher than the signal power. The modulation and demodulation of the message signal provides a signal-to-noise gain which enables the recovery of the message signal from a noisy channel. The greater the signal-to-noise ratio for a given system equates to: (1) the smaller the bandwidth required to transmit a message signal with a low rate of error or (2) the lower the average transmitted power required to transmit a message signal with a low rate of error over a given bandwidth.

Three general types of spread-spectrum communication techniques exist, including:

The modulation of a carrier by a digital code sequence bit rate is much higher than the information signal bandwidth. Such systems are referred to as "direct sequence" modulated systems.

Carrier frequency shifting in discrete increments in a pattern dictated by a code sequence. These systems are called "frequency hoppers". The transmitter jumps from frequency to frequency within some predetermined set; the order of frequency usage is determined by a code sequence. Similarly "time hopping" and "time-frequency hopping" have times of transmission which are regulated by a code sequence.

Pulse-FM or "chirp" modulation in which a carrier is swept over a wide band during a given pulse interval.

Information (i.e., the message signal) can be embedded in the spectrum signal by several methods. One method is to add the information to the spreading code before it is used for spreading modulation. This technique can be used in direct sequence and frequency hopping systems. It will be noted that the information being sent must be in a digital form prior to adding it to the spreading code, because the combination of the spreading code, typically a binary code, involves modulo-2 addition. Alternatively, the information or message signal may be used to modulate a carrier before spreading it.

Thus, a spread-spectrum system must have two properties: (1) the transmitted bandwidth should be much greater than the bandwidth or rate of the information being sent, and (2) some function other than the information being sent is employed to determine the resulting modulated channel bandwidth.

The essence of the spread-spectrum communication involves the art of expanding the bandwidth of a signal, transmitting the expanded signal and recovering the desired signal by remapping the received spread-spectrum into the original information bandwidth. Furthermore, in the process of carrying out this series of bandwidth trades, the purpose of spread-spectrum techniques is to allow the system to deliver information with low error rates in a noisy signal environment.

The present invention enhances the ability of spread-spectrum systems and, in particular, code division multiple access (CDMA) cellular radio-telephone systems to recover spread-spectrum signals from a noisy radio communication channel. In CDMA cellular radio-telephone systems, the "users" are on the same frequency and separated only by unique user codes. The noise interference level in the communication channel is directly related to the interference level created by the users plus additive Gaussian noise and not solely by additive Gaussian noise like in other communication systems. Thus, the number of users that can simultaneously use the same frequency band in a given cellular region with a low relative of additive Gaussian noise is limited primarily by the code noise of all active "users". The present invention reduces the effects of undesired user code noise and thus significantly increases the number of users which can simultaneously be serviced by a given cellular region.

SUMMARY OF THE INVENTION

A spread-spectrum noise canceller is provided. A received phase and a received amplitude for a first and a second component of a received spread-spectrum signal are determined. The second component is a replica of the first component which was received at a different time. In addition, the spread-spectrum signal includes a known signal. A portion of a spread-spectrum noise signal in the received signal is canceled by generating an estimated signal by spreading the known signal at the second component received phase with the known signal at the first component received phase and adjusting a gain of an integrated form of the spread known signal as a function of the received amplitudes of the first and the second components. Subsequently, the known signal is processed out of the received spread-spectrum signal by subtracting the estimated signal from a demodulated form of the received spread-spectrum signal.

DETAILED DESCRIPTION

Figure 1:
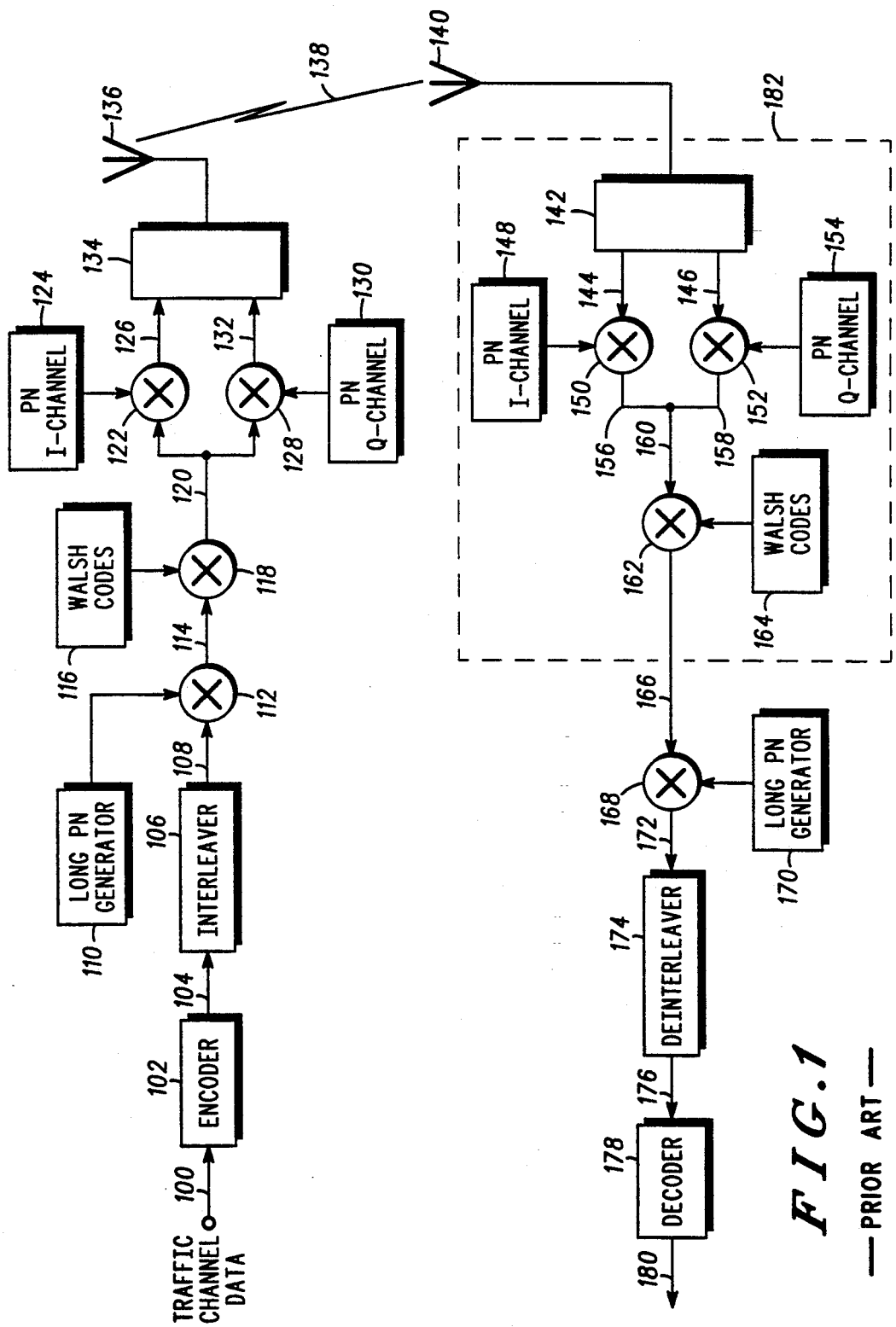
FIG. 1 is a diagram showing a prior art spread-spectrum communication system.

Referring now to FIG. 1, a prior art spread-spectrum communication system, as substantially described in U.S. Pat. No. 5,103,459 for Gilhousen et al. filed Jun. 25,1990, and "On the System Design Aspects of code Division Multiple Access (CDMA) Applied to Digital Cellular and Personal Communication Networks," Allen Salmasi and Klein S. Gilhousen, presented at the *41st IEEE Vehicular Technology Conference* on May 19-22, 1991 in St. Louis, Mo., pages 57-62, is shown.

In the prior art spread-spectrum communication system, traffic channel data bits 100 are input to an encoder 102 at a particular bit rate (e.g., 9.6 kilobits/second). The traffic channel data bits can include either voice converted to data by a vocoder, pure data, or a combination of the two types of data. Encoder 102 convolutionally encodes the input data bits 100 into data symbols at a fixed encoding rate. For example, encoder 102 encodes received data bits 100 at a fixed encoding rate of one data bit to two data symbols such that the encoder 102 outputs data symbols 104 at a 19.2 kilosymbols/second rate. The encoder 102 accommodates the input of data bits 100 at variable rates by encoding repetition. That is when the data bit rate is slower than the particular bit rate at which the encoder 102 is designed to operate, then the encoder 102 repeats the input data bits 100 such that the input data bits 100 are provided to the encoding elements within the encoder 102 at the equivalent of the input data bit rate at which the encoding elements are designed to operate. Thus, the encoder 102 outputs data symbols 104 at the same fixed rate regardless of the rate at which data bits 100 are input to the encoder 102.

The data symbols 104 are then input into an interleaver 106. Interleaver 106 interleaves the input data symbols 104. This interleaving of related data symbols 104 causes bursts of errors in a communication channel 138 to be spread out in time and thus to be handled by a decoder 178 as if they were independent random errors. Since, communication channel 138 memory decreases with time separation, the idea behind interleaving is to separate (i.e., make independent) the related data symbols 104 of an encoded data bit 100 in time. The intervening space in a transmission block is filled with other data symbols 104 related to other encoded bits 100. Separating the data symbols 104 sufficiently in time effectively transforms a communication channel 138 with memory into a memoryless one, and thereby enables the use of the random-error correcting codes (e.g., convolutional codes and block codes). Subsequently, a maximum likelihood convolutional decoder 178 can make a decision based on a sequence of data samples 176 of a received signal in which each data sample 176 is assumed to be independent from the other data samples 176. Such an assumption of independence of data samples 176 or memorylessness of the communication channel 138 can improve the performance of a maximum likelihood decoder 178 over a decoder which does not make such assumptions. The interleaved data symbols 108 are output by the interleaver 106 at the same data symbol rate that they were input (e.g., 19.2 kilosymbols/second) to one input of an Exclusive-OR/multiplier 112.

A long pseudo-noise (PN) generator 110 is operatively coupled to the other input of the Exclusive-OR/multiplier 112 to enhance the security of the communication in the communication channel by scrambling the data symbols 108. The long PN generator 110 uses a long PN sequence to generate a user specific sequence of symbols or unique user spreading code at a fixed rate equal to the data symbol rate of the data symbols 108 which are input to the other input of the Exclusive-OR gate 112 (e.g., 19.2 kilosymbols/second). The scrambled data symbols 114 are output from the Exclusive-OR/multiplier 112 at a fixed rate equal to the rate that the data symbols 108 are input to the Exclusive-OR gate 112 (e.g., 19.2 kilosymbols/second) to one input of an Exclusive-OR/multiplier 118.

A code division channel selection generator 116 provides a particular predetermined length Walsh code to the other input of the Exclusive-OR/multiplier 118. The code division channel selection generator 116 can provide one of 64 orthogonal codes corresponding to 64 Walsh codes from a 64 by 64 Hadamard matrix wherein a Walsh code is a single row or column of the matrix. The Exclusive-OR/multiplier 118 uses the particular Walsh code input by the code division channel generator 116 to spread the input scrambled data symbols 114 into Walsh code spread data symbols 120. It will be appreciated by those skilled in the art that "spreading" is a term used to describe the operation of increasing the number of symbols which represent input data symbols. For example, the combiner 118 may receive a sequence of scrambled data symbols 114 at a rate of 19.2 kilosymbols/second. Each scrambled data symbol 114 is combined with a Walsh spreading code 116 such that each scrambled data symbol 114 is represented by or spread into a single 64 bit length Walsh spreading code 120. As a result, the Walsh code spread data symbols 120 are output from the Exclusive-OR/multiplier 118 at a fixed chip rate (e.g., 1.2288 Megachips/second). The term "chip" is used in the art interchangeable with the term "bits" when describing segments of a spread digital signal.

The Walsh code spread data symbols 120 are provided to an input of two Exclusive-OR/multipliers 122 and 128, respectively. A pair of short PN sequences (i.e., short when compared to the long PN sequence used by the long PN generator 110) are generated by I-channel PN generator 124 and Q-channel PN generator 130. These PN generators 124 and 130 may generate the same or different short PN sequences. The Exclusive-OR/multipliers 122 and 128 further spread the input Walsh code spread data 120 with the short PN sequences generated by the PN I-channel generator 124 and PN Q-channel generator 130, respectively. The resulting I-channel code spread sequence 126 and Q-channel code spread sequence 132 are used to quadrature-phase shift key (QPSK) modulate a quadrature pair of sinusoids 134 by driving the power level controls of a pair of sinusoids. The sinusoids' output signals are summed, bandpass filtered, translated to a radio frequency (RF), amplified, filtered and radiated by an antenna 136 to complete transmission of the traffic channel data bits 100 in a communication channel 138.

Antenna 140 receives a spread-spectrum signal such that the received signal can be processed in a substantially complementary set of operations as compared to the set of operations performed on the traffic channel data bits 100 prior to their transmission over communication channel 138 by antenna 136. The received spread-spectrum signal is translated to a baseband frequency, filtered, and QPSK demodulated 142 into a demodulated spread-spectrum signal 144, 146. Subsequently, the demodulated spread-spectrum signal 144, 146 is quadrature despread. A pair of short PN sequences are generated by I-channel PN generator 148 and Q-channel PN generator 154. These PN generators 148 and 154 must generate the same short PN sequences as the PN generators 124 and 130, respectively. The Exclusive-OR/multipliers 150 and 152 despread the input demodulated spread-spectrum signals 144 and 146, respectively. The resulting I-channel code despread sequence 156 and Q-channel code despread sequence 158 are combined into quadrature despread data samples 160.

A code division channel selection generator 164 provides a particular predetermined length Walsh code to an input of the Exclusive-OR/multiplier 162. The code division channel selection generator 164, like generator 116, can provide one of 64 orthogonal codes corresponding to 64 Walsh codes from a 64 by 64 Hadamard matrix wherein a Walsh code is a single row or column of the matrix, but to properly despread a particular code transmission the same Walsh code as the transmitter generator 116 generated must be generated. The Exclusive-OR/multiplier 162 uses the particular Walsh code input by the code division channel generator 164 to despread the input quadrature despread data samples 160 into Walsh code despread data samples 166. It will be appreciated by those skilled in the art that "despreading" is a term used to describe the operation of decreasing the number of samples which represent input. For example, the combiner 162 may receive a sequence of despread data samples 160 at a rate of 1.2288 Megasamples/second. A group of 64 despread data samples 160 is combined with a selected Walsh despreading code 164 such that the group of 64 despread data samples 160 is represented by or despread into a single Walsh despread data sample 166. As a result, the Walsh code despread data samples 166 are output from the Exclusive-OR/multiplier 162 at a fixed rate (e.g., 19.2 kilosamples/second).

A long PN generator 170 is operatively coupled to the input of the Exclusive-OR/multiplier 168 to descramble the despread data samples 166. The long PN generator 170 uses a long PN sequence to generate a user specific sequence of samples or unique user spreading code at a fixed rate equal to the data samples rate of the despread data samples 166 which are input to the other input of the Exclusive-OR gate 168 (e.g., 19.2 kilosamples/second). This operation uses the same long PN sequence as generated by long PN generator 110 and is the logical complement of the scrambling operation performed by the Exclusive-OR gate 112. The descrambled data samples 172 are output from the Exclusive-OR/multiplier 168 at a fixed rate equal to the rate that the despread data samples 166 are input to the Exclusive-OR gate 168 (e.g., 19.2 kilosamples/second).

The descrambled data samples 172 are then input into a deinterleaver 174. Deinterleaver 174 deinterleaves the input descrambled data samples 172 in a manner which is the logical complement of the interleaver 106. The deinterleaved data samples 176 are output by the deinterleaver 174 at the same data sample rate that they were input (e.g., 19.2 kilosamples/second). Subsequently, a maximum likelihood convolutional decoder 178 makes decisions based on the input sequence of deinterleaved data samples 176. The maximum likelihood decoder 178 preferably generates estimated data bits 180 by utilizing maximum likelihood decoding techniques which are substantially similar to the Viterbi decoding algorithm.

Figure 2:
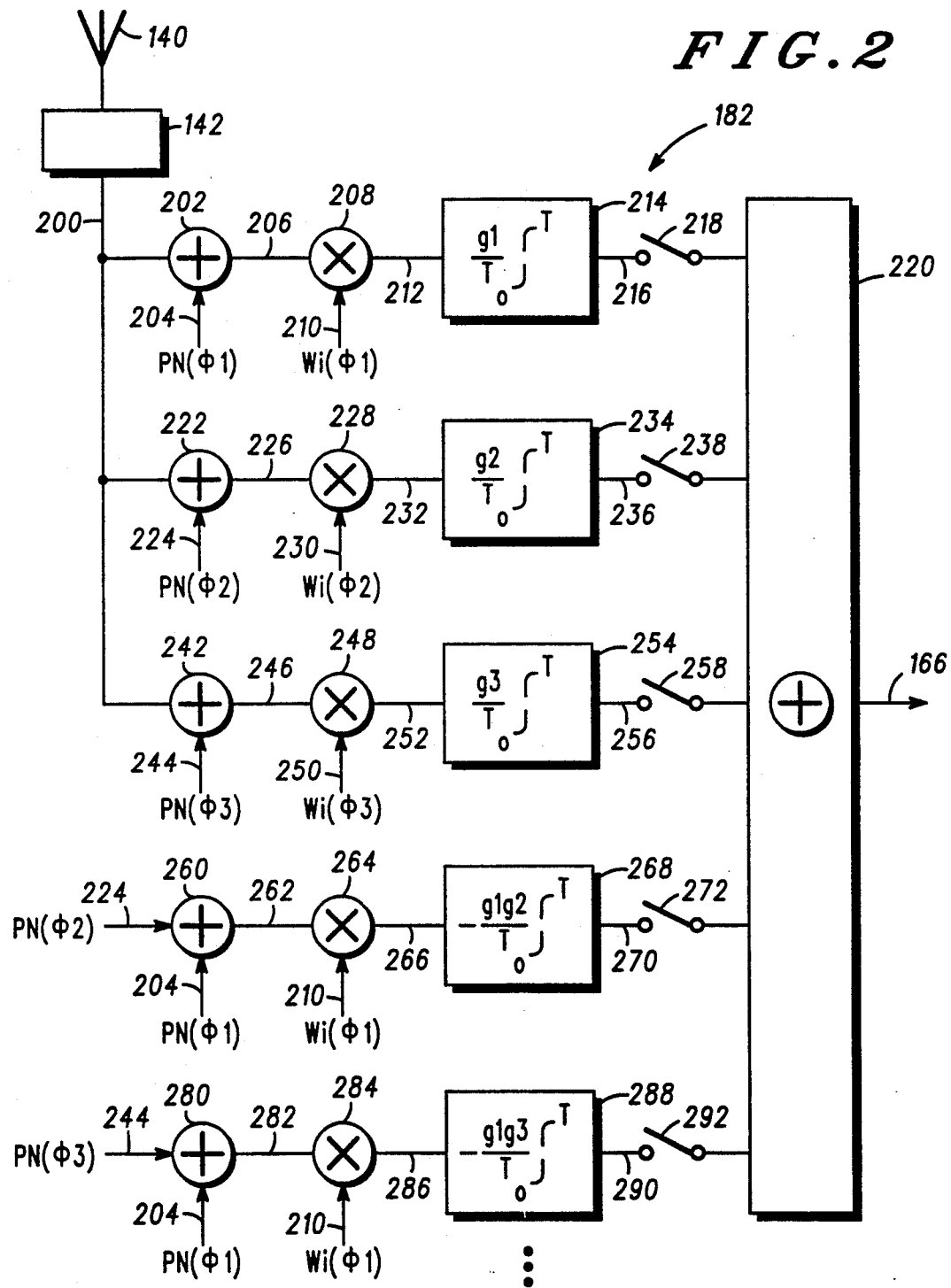
FIG. 2 is a diagram showing a preferred embodiment internal structure of a receiver having a spread-spectrum noise canceller for use in the prior art spread-spectrum communication system shown in FIG. 1.

Referring now to FIG. 2, a diagram is shown of a preferred embodiment internal structure of a portion 182 of a receiver having a spread-spectrum noise canceller for use in the prior art spread-spectrum communication system shown in FIG. 1.

The receiver portion 182 as described hereinafter preferably is implemented in a mobile communication unit of a cellular radio communication system also having a plurality of base stations or central communication sites. It will be appreciated by those skilled in the art that the particular receiver portion structure 182 having a noise canceller described herein could readily be adapted for use in the central communication sites or in any other communication system having similar knowledge of the multipath characteristics of the signal received on a communication channel.

It will be appreciated by those skilled in the art that spreading codes other than Walsh spreading codes 116, 164 can be used to separate data signals from one another in a CDMA communication system. For instance, PN spreading codes can be used to separate a plurality of data signals. A particular data signal can be separated from the other data signals by using a particular PN spreading code which is offset by a particular phase to spread the particular data signal. For example, in a CDMA spread-spectrum communication system, a particular PN spreading code can be used to generate a plurality of channels by using a different offset phase for the PN spreading code for each channel of the communication system.

Furthermore, the modulation scheme of the signals is assumed to be quadrature phase shift keying (QPSK). However, it will be appreciated by those skilled in the art that other modulation techniques can be used without departing from the teachings of the present invention. Finally, in the preferred embodiment, the communication channel 138 for the cellular communication system is in the 900 MHz region of the electromagnetic spectrum. However, other regions of the electromagnetic spectrum may be used without departing from the teachings of the present invention.

The portion 182 of the receiver shown implements "Rake" receiving techniques to reduce the effect of multipath fading in the communication channel. It will be appreciated by those skilled in the art that "Rake" receiving techniques are well known in the art of radio communication. For example, "A Communication Technique for Multipath Channels," R. Price and P. E. Green, Jr., *Proceedings of the IRE*, March 1958, pages 555-570 describes the basic operation of a "Rake" receiver. Briefly, a "Rake" receiver performs a continuous, detailed measurement of the multipath characteristic of a received signal. This knowledge is then exploited to combat the selective fading by detecting the echo signals individually, using a correlation method, and algebraically combining those echo signals into a single detected signal. The intersymbol interference is attenuated by varying the time delay or phase between the various detected echo signals prior to their algebraic combination.

Similar to the prior art communication system shown in FIG. 1, the antenna 140, shown in FIG. 2 receives a spread-spectrum signal such that the received signal can be processed in a substantially complementary set of operations as compared to the set of operations performed on the traffic channel data bits 100 prior to their transmission over communication channel 138 by antenna 136. The received spread-spectrum signal is a composite signal including several signals in different spread-spectrum channels. At least one of these spread-spectrum signals is a known pilot data signal. Each of spread-spectrum signals in the composite received spread-spectrum signal may be received by receiver 182 from one or more base stations and along one or more communication paths. As a result, each of the signals in a particular spread-spectrum channel may have several components which vary in amplitude and/or phase from the other signals in the channel. In the preferred embodiment, similar pilot data signals are transmitted from each base station in the communication system. However, when a mobile communication unit is attempting to retrieve (i.e., demodulate and decode) a particular signal from a spread-spectrum channel, these pilot data signals contribute to the non-deterministic noise in the communication channel 138. These undesired signals can be canceled when the receiver has obtained particular information concerning the communication channel and the received composite spread-spectrum signal.

The spread-spectrum signal received on antenna 140 is translated to a baseband frequency, filtered, and QPSK demodulated 142 into a demodulated spread-spectrum signal 200. During this demodulation process 142, a received phase and a received amplitude for each component of the received spread-spectrum signal is determined. The phase represents the moment in time that a particular component is received relative to the other components. The amplitude represents the relative received signal strength or received accuracy of the component relative to the other components. During the following discussion, the received spread-spectrum signal is assumed to have a signal in one particular spread-spectrum channel and further that the signal has three components. These signal components have followed different communication channel paths on their way to receiver 182. For this example, the first component was transmitted by a base station in a primary serving cell and was received at a phase $\phi_1$ and an amplitude $A_1$. Similarly, the second component was transmitted by the base station in the primary serving cell, but traveled along a different communication path than the first component, and was received at a phase $\phi_2$ and an amplitude $A_2$. Finally, the third component was transmitted by a base station in a secondary serving cell (e.g., during a soft hand-off situation) and was received at a phase $\phi_3$ and an amplitude $A_3$.

In the preferred embodiment "Rake" receiver 182, demodulated spread-spectrum signal 200 is input to individual receiver portions which manipulate each of the three signal components. The first signal component is quadrature despread by inputting the demodulated spread-spectrum signal 200 into Exclusive-OR combiner 202. A pair of short PN sequences are generated by I-channel PN generator 148 and Q-channel PN generator 154 (shown in FIG. 1). The pair of short PN sequences is input 204 to the Exclusive-OR combiner 202 at the first component phase $\phi_1$. Exclusive-OR combiner 202 despreads the input demodulated spread-spectrum signal 200. In addition, Exclusive-OR combiner 202 combines the resulting I-channel code despread sequence and Q-channel code despread sequence into quadrature despread data samples 206. It will be appreciated by those skilled in the art that although a single Exclusive-OR combiner 202 is described above, like in the prior art receiver, shown in FIG. 1, two Exclusive-OR/multipliers (e.g., multipliers 150 and 152) could be used.

The quadrature despread data samples 206 for the first signal component are input to Exclusive-OR/multiplier 208. A code division channel selection generator 164 (shown in FIG. 1) provides a particular predetermined length Walsh code ($W_i$) at the first signal component phase $\phi_1$ 210 to the other input of the Exclusive-OR/multiplier 208. The Exclusive-OR/multiplier 208 uses the particular Walsh code ($W_i$) 210 input by the code division channel generator 164 to despread the input quadrature despread data samples 206 into Walsh code despread data samples 212.

These Walsh code despread data samples 212 are then input to integrator 214 which integrates the data samples 212 over a predetermined time period (T) and adjusts the gain of the input data samples 212 signal. The predetermined time period (T) preferably corresponds to a desired output rate of data samples from the "Rake" receiver 182 (e.g., 19.2 kilosamples/second output rate which corresponds to T=1/19,200 of a second). The gain of the input data samples 212 signal is adjusted by a gain factor $g_1$ which is a function of the amplitude of the first signal component $A_1$ ($g_1=f(A_1)$). This gain factor $g_1$ is also determined such that it enables maximum ratio combining of the three signal components. In addition, the input data sample 212 gain is divided/adjusted by the predetermined time period (T) so that the output signal 216 gain better reflects the gain associated with each input data sample 212. The output of integrator 214 is a Walsh code despread data sample signal 216 for the first signal component. This first signal component Walsh code despread data sample signal 216 may optionally be switched into an input 218 of a signal processor 220. It will be appreciated by those skilled in the art that the integrator 214 function may be implemented with a data sample summing circuit and multiplier.

The second signal component can be derived from the demodulated spread-spectrum signal 200 in a manner similar to that previously described for the first signal component. The second signal component is quadrature despread by inputting the demodulated spread-spectrum signal 200 into Exclusive-OR combiner 222. A pair of short PN sequences are generated by I-channel PN generator 148 and Q-channel PN generator 154 (shown in FIG. 1). The pair of short PN sequences is input 224 to the Exclusive-OR combiner 222 at the second component phase $\phi_2$. Exclusive-OR combiner 222 despreads the input demodulated spread-spectrum signal 200 and combines the resulting I-channel code despread sequence and Q-channel code despread sequence into quadrature despread data samples 226.

The quadrature despread data samples 226 for the second signal component are input to Exclusive-OR/multiplier 228. A code division channel selection generator 164 (shown in FIG. 1) provides a particular predetermined length Walsh code ($W_i$) at the second signal component phase $\phi_2$ to the other input of the Exclusive-OR/multiplier 228. The Exclusive-OR/multiplier 228 uses the particular Walsh code ($W_i$) at the second signal component phase $\phi_2$ 230 input by the code division channel generator 164 to despread the input quadrature despread data samples 226 into Walsh code despread data samples 232.

These Walsh code despread data samples 232 are then input to integrator 234 which integrates the data samples 232 over a predetermined time period (T) and adjusts the gain of the input data samples 232 signal. The gain of the input data samples 232 signal is adjusted by a gain factor $g_2$ which is a function of the amplitude of the second signal component $A_2$ ($g_2 = f(A_2)$). This gain factor $g_2$ is also determined such that it enables maximum ratio combining of the three signal components. In addition, the input data sample 232 gain is divided/adjusted by the predetermined time period (T) so that the output signal 236 gain better reflects the gain associated with each input data sample 232. The output of integrator 234 is a Walsh despread data sample signal 236 for the second signal component. This second signal component Walsh code despread data sample signal 236 may optionally be switched into an input 238 of the signal processor 220.

The third signal component can be derived from the demodulated spread-spectrum signal 200 in a manner similar to that previously described for the first and second signal components. The third signal component is quadrature despread by inputting the demodulated spread-spectrum signal 200 into Exclusive-OR combiner 242. A pair of short PN sequences are generated by I-channel PN generator 148 and Q-channel PN generator 154 (shown in FIG. 1). The pair of short PN sequences is input 244 to the Exclusive-OR combiner 242 at the third component phase $\phi_3$. Exclusive-OR combiner 242 despreads the input demodulated spread-spectrum signal 200 and combines the resulting I-channel code despread sequence and Q-channel code despread sequence into quadrature despread data samples 246.

The quadrature despread data samples 246 for the third signal component are input to Exclusive-OR/multiplier 248. A code division channel selection generator 164 (shown in FIG. 1) provides a particular predetermined length Walsh code ($W_j$) at the third signal component phase $\phi_3$ to the other input of the Exclusive-OR/multiplier 248. The Exclusive-OR/multiplier 248 uses the particular Walsh code ($W_j$) at the third signal component phase $\phi_3$ 250 input by the code division channel generator 164 to despread the input quadrature despread data samples 246 into Walsh code despread data samples 252.

These Walsh code despread data samples 252 are then input to integrator 254 which integrates the data samples 252 over a predetermined time period (T) and adjusts the gain of the input data samples 252 signal. The gain of the input data samples 252 signal is adjusted by a gain factor $g_3$ which is a function of the amplitude of the third signal component $A_3$ ($g_3 = f(A_3)$). This gain factor $g_3$ is also determined such that it enables maximum ratio combining of the three signal components. In addition, the input data sample 252 gain is divided/adjusted by the predetermined time period (T) so that the output signal 256 gain better reflects the gain associated with each input data sample 252. The output of integrator 254 is a Walsh despread data sample signal 256 for the third signal component. This third signal component Walsh code despread data sample signal 256 may optionally be switched into an input 258 of the signal processor 220.

The demodulated spread-spectrum signal 200 further includes non-deterministic noise consisting of two components. The two components to the non-deterministic noise are:

All of the CDMA spread-spectrum signals which are not being demodulated by the receiver. These consist of a large number of low-level interfering users using the same communication channel as the receiver which are in nearby cells of the communication system.

Receiver front end noise. By design, additive noise preferably is below the demodulated spread-spectrum signal 200 when the communication channel is operating at full capacity.

A portion of this first spread-spectrum noise component can be canceled from the demodulated spread-spectrum signal 200 provided sufficient information is known to the receiver. This information includes several pieces of data already known to a typical "Rake" receiver like the preferred embodiment receiver portion 182 described above. This known data includes: the amplitude (i.e. $A_1$, $A_2$, and $A_3$) and phase (i.e., $\phi_1$, $\phi_2$, and $\phi_3$) of each signal component, the short PN spread code sequences 148 and 154 used by the communication system, and the Walsh code ($W_j$) for the particular channel being received. With this known data, the receiver portion 182 may be configured to cancel the noise related to other signal components such as a pilot channel carrier signal which may be interfering with the desired signal components.

Typically each Walsh code channel does not contribute any noise to the other Walsh code channels because orthogonality is maintained. However, this is not true when there is significant delay spread ($\geq$ one chip delay) and/or when the receiving unit is in a communication channel hand-off state between two or more transmitters. A possible situation in which these other channels may contribute noise or cause interference in the desired communication channel is when either a delayed replica of the transmitted carrier or transmitted carriers of originating in other cells is received in the desired communication channel by the receiver portion 182 and the receiver portion 182 does not distinguish between the desired signal and the interfering signals. As more of these interfering signals contribute to the demodulated spread-spectrum signal 200 received by the receiver, the signal to noise ratio may deteriorate to near or below a preferred threshold.

In the preferred embodiment communication system, the delayed pilot signal replicas of the primary serving cell and pilot signal energy from other nearby cells cause approximately 1 dB of the total noise in the desired communication channel. Through the following cancellation process, most of that 1 dB of noise can be canceled which results in a greater signal to noise ratio for the desired signal. Some of the advantages of this cancellation technique include: removing or reducing undesired pilot channel signal interference from the received signal and allowing an increase in the number of users on a particular CDMA communication channel due to the increased capability of the receivers to handle interference in the communication channel.

A first estimated interference signal can be derived from the known data. The previously generated pair of short PN sequences having a second component phase $\phi_2$ are input 224 to an Exclusive-OR combiner 260. Similarly, previously generated pair of short PN sequences having a first component phase $\phi_1$ are input 204 to an Exclusive-OR combiner 260. Exclusive-OR combiner 260 spreads the second component phase $\phi_2$ sequences 224 with the first component phase $\phi_1$ sequences 204 and combines the resulting I-channel code spread sequence and Q-channel code spread sequence into quadrature spread data samples 262.

The quadrature spread data samples 262 for the first estimated interference signal are input to Exclusive-OR/multiplier 264. The previously generated particular predetermined length Walsh code ($W_i$) at the first signal component phase $\phi_1$ 210 is provided to the other input of the Exclusive-OR/multiplier 264. The Exclusive-OR/multiplier 264 uses the particular Walsh code ($W_i$) at the first signal component phase $\phi_1$ 210 to spread the input quadrature spread data samples 262 into Walsh code spread data samples 266.

These Walsh code spread data samples 266 are then input to integrator 268 which integrates the data samples 266 over a predetermined time period (T) and adjusts the gain of the input data samples 266 signal. The gain of the input data samples 266 signal is adjusted by a negative of a product of gain factor $g_1$ and $g_2$ ($-g_1 \cdot g_2$) which as previously noted are functions of the amplitudes of the first and second signal components $A_1$ and $A_2$, respectively. This gain factor $-g_1 \cdot g_2$ is also determined such that it enables a subtraction from the maximum ratio combination of the three signal components (i.e., a negative factor). In addition, the input data sample 266 gain is adjusted by the predetermined time period (T) so that the output signal 270 gain better reflects the gain associated with each input data sample 266. The output of integrator 268 is a first estimated Walsh despread data sampled interference signal 270. This first estimated interference signal 270 may optionally be switched into or input to 272 a signal processor 220.

A second estimated interference signal can also be derived from the known data. The previously generated pair of short PN sequences having a third component phase $\phi_3$ are input 244 to an Exclusive-OR combiner 280. Similarly, previously generated pair of short PN sequences having a first component phase $\phi_1$ are input 204 to an Exclusive-OR combiner 280. Exclusive-OR combiner 280 spreads the third component phase $\phi_3$ sequences 244 with the first component phase $\phi_1$ sequences 204 and combines the resulting I-channel code spread sequence and Q-channel code spread sequence into quadrature spread data samples 282.

The quadrature spread data samples 282 for the second estimated interference signal are input to Exclusive-OR/multiplier 284. The previously generated particular predetermined length Walsh code ($W_j$) at the first signal component phase $\phi_1$ 210 is provided to the other input of the Exclusive-OR/multiplier 284. The Exclusive-OR/multiplier 264 uses the particular Walsh code ($W_i$) at the first signal component phase $\phi_1$ 210 to spread the input quadrature spread data samples 282 into Walsh code spread data samples 286.

These Walsh code spread data samples 286 are then input to integrator 288 which integrates the data samples 286 over a predetermined time period (T) and adjusts the gain of the input data samples 286 signal. The gain of the input data samples 286 signal is adjusted by a negative of a product of gain factor $g_1$ and $g_3$ ($-g_1 \cdot g_3$) which as previously noted are functions of the amplitudes of the first and third signal components $A_1$ and $A_3$, respectively. This gain factor $-g_1 \cdot g_3$ is also determined such that it enables a subtraction from the maximum ratio combination of the three signal components (i.e., a negative factor). In addition, the input data sample 286 gain is adjusted by the predetermined time period (T) so that the output signal 290 gain better reflects the gain associated with each input data sample 286. The output of integrator 288 is a second estimated Walsh despread data sampled interference signal 290.

This second estimated interference signal 290 may optionally be switched into or input to 292 a signal processor 220.

The generation of the first and second estimated interference signal was made by way of example only. It will be appreciated by those skilled in the art that this estimated interference signal process may be continued for any other interfering signal for which sufficient information is known.

Finally, signal processor 220 preferably maximum ratio combines several signal components (e.g., signal components 216, 236, 256, 270, and/or 290) into a single Walsh code despread data sample 166 signal. This single Walsh code despread data sample 166 signal is output from the signal processor 220 at a fixed rate (e.g., 19.2 kilosamples/second). Subsequently, the Walsh code despread data sample 166 signal is preferably further processed in a manner similar to the prior art receiver, shown in FIG. 1, to generate estimated data bits 180.

It will be appreciated by those skilled in the art that it may not be desirable to cancel all of the interfering signals from the desired signal. Thus, the signal strengths of the interfering signals may be compared to the desired signal. Further, only the undesired interfering signals having a signal strength greater than the desired signal should be removed from the composite demodulated spread-spectrum signal 200. If the weaker undesired interfering signals are removed, then the desired data signal may be partially corrupted. In addition, it will be appreciated by those skilled in the art that a spread-spectrum signal (e.g., the desired signal) typically can be detected and retrieved from a composite signal when it's signal strength is greater than the signal strengths of interfering signals. Thus, the removal of interfering signals from composite signal which have a signal strength less than the desired signal is unnecessary and may unduly increase the detection and retrieval time of the desired signal.

For example, in the case of the desired signal having the three signal component Walsh code despread data sample signals 216, 236, and 256, an interferer is removed from the combined single Walsh code despread data sample 166 signal, if it has a stronger signal strength than the desired signal components. For instance, the first estimated signal 270 may have a signal strength greater than the third signal component Walsh code despread data sample signal 256 and as such should be removed from the combined single Walsh code despread data sample 166 signal. Thus, the first estimated signal 270 is switched input 272 of the signal processor 220. In contrast, the second estimated signal 290 may have a signal strength less than the third signal component Walsh code despread data sample signal 256 and as such should not be removed from the combined single Walsh code despread data sample 166 signal. Thus, the second estimated signal 290 is not switched input 292 of the signal processor 220. It will be appreciated by those skilled in the art that another signal quality or communication system metric may be used to determine which interfering signals should be canceled from the composite spread-spectrum signal without departing from the teachings of the present invention. For example, the cancellation of particular interfering signals may be determined by a comparison of a predetermined threshold to a function of the adjusted gains ($g_1$, $g_2$, and $g_3$) of the integrators 214, 234, and 254, respectively.

Figure 3:
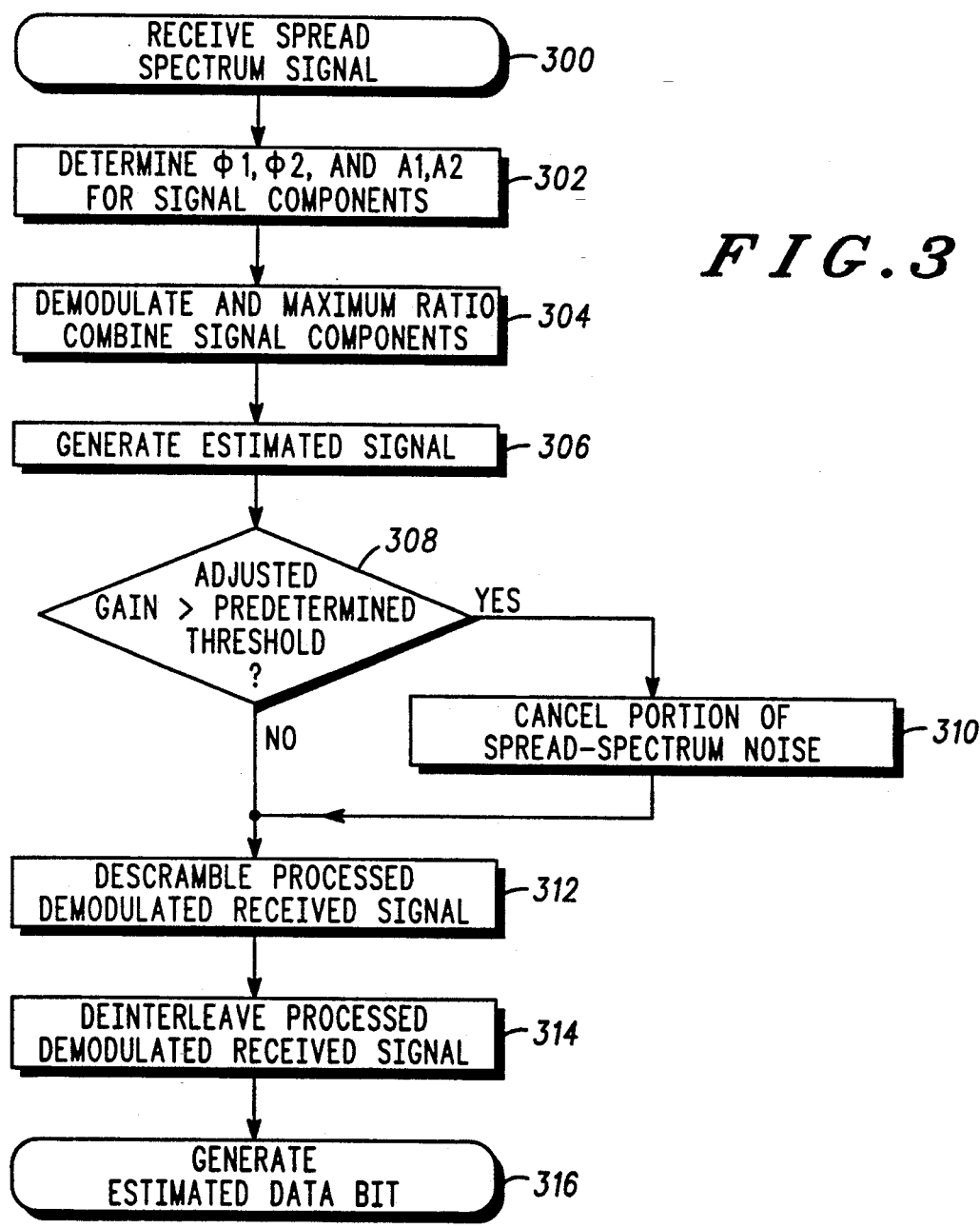
FIG. 3 is a flowchart summarizing the operation of the preferred embodiment noise canceller shown in FIG. 2.

The operation of the preferred embodiment noise canceller is summarized as the flowchart shown in FIG. 3. A spread-spectrum signal having a first and a second component is received 300 from over a communication channel. The first component being received at a different time from the second component. In addition, the received spread-spectrum signal includes a known signal (e.g., a cellular communication system pilot channel signal). A received phase ($\phi_1$, $\phi_2$) and a received amplitude ($A_1$, $A_2$) for the first and the second components of a received spread-spectrum signal is determined 302, respectively. Subsequently, the received spread-spectrum signal first and second components are demodulated and maximum ratio combined 304. In addition, an estimated signal is generated 306 by spreading the known signal at the second component received phase ($\phi_2$) with the known signal at the first component received phase ($\phi_1$), spreading the known signal at the second component received phase ($\phi_2$) with a channel selecting spreading code at the first component received phase ($\phi_1$), integrating the spread known signal over a predetermined time (T), and adjusting a gain of the integrated spread known signal as a function of the received amplitudes of the first ($A_1$) and the second components ($A_2$). Subsequently, a portion of a spread-spectrum noise signal is canceled 310 by processing the known signal out of the received spread-spectrum signal through subtracting the estimated signal from the demodulated received spread-spectrum signal only if 308 the adjusted gain of the integrated form of the spread known signal ($g_1g_2$) is greater than a predetermined threshold. Subsequently, the spread-spectrum signal receiving process may be completed by descrambling 312 the processed demodulated form of the received spread-spectrum signal by utilizing a known spreading code. In addition, the descrambled received spread-spectrum signal is deinterleaved 314 within a predetermined size block. Finally, at least one estimated data bit is generated 316 by utilizing maximum likelihood decoding techniques which are substantially similar to the Viterbi decoding algorithm to derive the at least one estimated data bit from the deinterleaved received spread-spectrum signal.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, it will be appreciated by those skilled in the art that the above described noise cancellation techniques can be performed in the intermediate or baseband frequencies without departing from the spirit and scope of the present invention as claimed. In addition, the modulator, antennas and demodulator portions of the preferred embodiment communication system as described were directed to spread-spectrum signals transmitted over a radio communication channel. However, as will be understood by those skilled in the art, the communication channel could alternatively be an electronic data bus, wireline, optical fiber link, or any other type of communication channel.

What is claimed is:

1. An apparatus comprising a spread-spectrum noise canceller, the spread-spectrum noise canceller comprising:

(a) determining means for determining a received phase and a received amplitude for a first and a second component of a received spread-spectrum signal, the first component being received at a different time from the second component, the spread-spectrum signal including a known signal; and (b) noise canceling means, operatively coupled to the determining means, for canceling a portion of a spread-spectrum noise signal in the received spread-spectrum signal by:
    (i) generating an estimated signal by spreading the known signal at the second component received phase with the known signal at the first component received phase and adjusting a gain of an integrated form of the spread known signal as a function of the received amplitudes of the first and the second components; and
    (ii) processing the known signal out of the received spread-spectrum signal by subtracting the estimated signal from a demodulated form of the received spread-spectrum signal.

2. The apparatus of claim 1 wherein the spread-spectrum noise canceller canceling means processes the known signal out of the received spread-spectrum signal only if the adjusted gain of the integrated form of the spread known signal is greater than a predetermined threshold.

3. The apparatus of claim 1 wherein the spread-spectrum noise canceller canceling means generates the estimated signal by further spreading the known signal at the second component received phase with a channel selecting spreading code at the first component received phase.

4. The apparatus of claim 1 further comprising:

(a) descrambling means, operatively coupled to the spread-spectrum noise canceller, for descrambling the processed demodulated form of the received spread-spectrum signal by utilizing a known spreading code;

(b) deinterleaving means, operatively coupled to the descrambling means, for deinterleaving the descrambled received spread-spectrum signal within a predetermined size block; and (c) decoding means, operatively coupled to the deinterleaving means, for generating at least one estimated data bit by utilizing maximum likelihood decoding techniques to derive the at least one estimated data bit from the deinterleaved received spread-spectrum signal.

5. The apparatus of claim 4 wherein the decoding means comprises means for generating at least one estimated data bit by utilizing maximum likelihood decoding techniques which are substantially similar to the Viterbi decoding algorithm.

6. An apparatus comprising a spread-spectrum noise canceller, the spread-spectrum noise comprising:

(a) receiving means for receiving a spread-spectrum signal having a first and a second component from over a communication channel, the first component being received at a different time from the second component, the spread-spectrum signal including a known signal;

(b) determining means, operatively coupled to the receiving means, for determining a received phase and a received amplitude for the first and the second components of a received spread-spectrum signal;

(c) demodulating means, operatively coupled to the receiving means, for demodulating the received spread-spectrum signal; and (d) noise canceling means, operatively coupled to the determining means and the demodulating means, for canceling a portion of a spread-spectrum noise signal in the received spread-spectrum signal by:

(i) generating an estimated signal by spreading the known signal at the second component received phase with the known signal at the first component received phase, integrating the spread known signal over a predetermined time, and adjusting a gain of the integrated spread known signal as a function of the received amplitudes of the first and the second components; and (ii) processing the known signal out of the received spread-spectrum signal by subtracting the estimated signal from the demodulated received spread-spectrum signal.

7. The apparatus of claim 6 wherein the spread-spectrum noise canceller canceling means processes the known signal out of the received spread-spectrum signal only if the adjusted gain of the integrated form of the spread known signal is greater than a predetermined threshold.

8. The apparatus of claim 6 wherein the spread-spectrum noise canceller canceling means generates an estimated signal by further spreading the known signal at the second component received phase with a channel selecting spreading code at the first component received phase.

9. The apparatus of claim 6 further comprising:

(a) descrambling means, operatively coupled to the spread-spectrum noise canceller, for descrambling the processed demodulated form of the received spread-spectrum signal by utilizing a known spreading code;

(b) deinterleaving means, operatively coupled to the descrambling means, for deinterleaving the descrambled received spread-spectrum signal within a predetermined size block; and (c) decoding means, operatively coupled to the deinterleaving means, for generating at least one estimated data bit by utilizing maximum likelihood decoding techniques to derive the at least one estimated data bit from the deinterleaved received spread-spectrum signal.

10. The apparatus of claim 6 wherein the communication channel is selected from the group consisting essentially of an electronic data bus, radio communication link, wireline and optical fiber link.

11. A spread-spectrum signal processing method, comprising:

(a) determining a received phase and a received amplitude for a first and second component of a received spread-spectrum signal, the first component being at a different time from the second component, the spread-spectrum signal including a known signal; and (b) canceling a portion of a spread-spectrum noise signal in the received spread-spectrum signal by:

(i) generating an estimated signal by spreading the known signal at the second component received phase with the known signal at the first component received phase and adjusting a gain of an integrated form of the spread known signal as a function of the received amplitudes of the first and the second components; and (ii) processing the known signal out of the received spread-spectrum signal by subtracting the estimated signal from a demodulated form of the received spread-spectrum signal.

12. The method of claim 11 wherein the step of canceling comprises processing the known signal out of the received spread-spectrum signal only if the adjusted of the integrated form of the spread known signal is greater than a predetermined threshold.

13. The method of claim 11 wherein the step of canceling comprises generating the estimated signal by further spreading the known signal at the second component received phase with a channel selecting spreading code at the first component received phase.

14. The method of claim 11 further comprising:

(a) descrambling the processed demodulated form of the received spread-spectrum signal by utilizing a known spreading code;

(b) deinterleaving the descrambled received spread-spectrum signal within a predetermined size block; and (c) generating at least one estimated data bit by utilizing maximum likelihood decoding techniques to derive the at least one estimated data bit from the deinterleaved received spread-spectrum.

15. The method of claim 14 wherein the step of generating at least one estimated data bit comprises utilizing maximum likelihood decoding techniques which are substantially similar to the Viterbi decoding algorithm.

16. A spread-spectrum signal processing method, comprising:

(a) receiving a spread-spectrum signal having a first and a second component from over a communication channel, the first component being received at a different time from the second component, the spread-spectrum signal including a known signal;

(b) determining a received phase and a received amplitude for the first and the second components of a received spread-spectrum signal;

(c) demodulating the received spread-spectrum signal; and (d) canceling a portion of a spread-spectrum noise signal in the received spread-spectrum signal by:

(i) generating an estimated signal by spreading the known signal at the second component received phase with the known signal at the first component received phase, integrating the spread known signal over a predetermined time, and adjusting a gain of the integrated spread known signal as a function of the received amplitudes of the first and the second components; and (ii) processing the known signal out of the received spread-spectrum signal by subtracting the estimated signal from the demodulated received spread-spectrum signal.

17. The method of claim 16 wherein the step of canceling comprises processing the known signal out of the received spread-spectrum signal only if the adjusted gain of the integrated form of the spread known signal is greater than a predetermined threshold.

18. The method of claim 16 wherein the step of canceling comprises generating the estimated signal by further spreading the known signal at the second component received phase with a channel selecting spreading code at the first component received phase.

19. The method of claim 16 further comprising:

(a) descrambling the processed demodulated form of the received spread-spectrum signal by utilizing a known spreading code;
(b) deinterleaving the descrambled received spread-spectrum signal within a predetermined size block; and
(c) generating at least one estimated data bit by utilizing maximum likelihood decoding techniques to derive the at least one estimated data bit from the deinterleaved received spread-spectrum.

20. The method of claim 19 wherein the communication channel is selected from the group consisting essentially of an electronic data bus, radio communication link, wireline and optical fiber link.

* * * * *

UNITED STATES PATENT AND TRADEMARK OFFICE
CERTIFICATE OF CORRECTION

PATENT NO. : 5,224,122
DATED : June 29, 1993
INVENTOR(S) : Bruckert

It is certified that error appears in the above-identified patent and that said Letters Patent is hereby corrected as shown below:

In the Claims:

Column 16, line 57, "noise comprising" should be --noise canceller comprising--
Col. 18, line 7, "adjusted of" should be --adjusted gain of--.
Col. 18, line 26, "received spread-spectrum." should be --received spread-spectrum signal.--
Col. 20, line 2, "spread-spectrum" should be --spread-spectrum signal--

Signed and Sealed this

Eighth Day of February, 1994

Attest:

BRUCE LEHMAN

*Attesting Officer*     *Commissioner of Patents and Trademarks*